United States Patent [19]

Brown

[11] Patent Number: 4,748,561
[45] Date of Patent: May 31, 1988

[54] METHOD OF PROTECTING COMPUTER SOFTWARE

[76] Inventor: Mark Brown, 174 Elmsley Ct., Ridgewood, N.J. 07450

[21] Appl. No.: 879,840

[22] Filed: Jun. 27, 1986

Related U.S. Application Data

[63] Continuation of Ser. No. 609,721, May 14, 1984, abandoned.

[51] Int. Cl.$^4$ .............................................. G06F 12/14
[52] U.S. Cl. ..................................................... 364/300
[58] Field of Search ...................... 364/200, 900, 300; 360/55

[56] References Cited

U.S. PATENT DOCUMENTS

| | | | |
|---|---|---|---|
| 4,074,326 | 2/1978 | Smith | 360/55 |
| 4,168,396 | 9/1979 | Best | 364/200 X |
| 4,306,289 | 12/1981 | Lumley | 364/200 |
| 4,462,078 | 7/1984 | Ross | 364/300 |

OTHER PUBLICATIONS

"Innocent Victims of the War Against Software Piracy". Author—David Bunnell from Jun. 1984 edition of PC World Magazine, pp. 13 & 14.

Primary Examiner—Raulfe B. Zache
Attorney, Agent, or Firm—Schweitzer & Cornman

[57] ABSTRACT

The disclosure is directed to a method of preparing a recording of a computer program whereby the recording is usable on one and only one preselected computer hardware system. The recording system of the invention comprises a two phase recording process wherein phase one of the system is utilized to record on a permanent memory element all of the basic information to be stored thereon, including a preselected application program for a computer system, as well as additional information containing instructions to make the first computer used in connection with recording a component to complete phase two of the recording process. The second phase recording aspects of the invention complete the recording of each element in an individual recording step on the selected first used computer in a manner to link the operability of the individual recording to the particular, selected first-to-be-used computer machine.

4 Claims, 3 Drawing Sheets

METHOD OF PROTECTING COMPUTER SOFTWARE

This is a continuation of application Ser. No. 609,721, filed May 14, 1984, now abandoned.

BACKGROUND AND SUMMARY OF THE INVENTION

The invention is directed to a novel method of preparing a recording (e.g., magnetic disk or tape) of a computer program whereby the recording is usable on one, and only one, preselected computer hardware system.

In recent years, the introduction of the personal or mini-computer has made it feasible for a mass utilization of computer systems by individuals and small businesses, both in the home and at work. Complementing, and indeed nuturing, this widespread distribution and use of such personal computer hardware systems is a fast growing software industry which has been rapidly developing dozens of proprietary software "packages" for mass distribution to users of personal computers. The software packages are directed to any number of practical applications from, e.g., simple checking account balancing programs to comprehensive accounting and financial systems. These proprietary programs have many practical applications in households and small business environments and greatly enhance the utility and effectiveness of personal computer hardware systems.

Typically, a mass marketed software package includes a recording of a particular proprietary computer program which is in a form that is "readable" by a personal computer. The most common form of recording is a magnetic disk wherein the instructions, routines, sequences of steps and so on of the program are permanently recorded on the disk in a predetermined array of discrete magnetic states which are representative of the information contained in the program. Such a disk is inserted into a disk drive component of a personal computer system and the information thereon is "read" by the computer so that the computer may store and execute the functions of the program.

A problem associated with the mass distribution of proprietary computer programs is that it is a relatively simple operation to copy the proprietary information from one disk to another disk. Thus, one purchaser of a commercially distributed software package may make several additional, unauthorized copies of the disk for use by friends and associates. Of even greater concern, an unauthorized distributer may make and sell large quantities of unauthorized copies. The net result is that the owner of the proprietary program may lose a considerable amount of sales due to the existence of large numbers of wrongfully obtained and unauthorized copies of his product.

It is the primary objective of the present invention to provide a novel method of recording information onto a disk whereby any particular disk is made usable on only one particular, preselected computer system, e.g., the particular computer owned by the first authorized purchaser of the disk. Thus, even if several copies of the disk are made, the copies will also only be usable on the previously selected, particular computer and, therefore, will not be suitable for distribution beyond the first authorized purchaser of the disk. Pursuant to the invention, each disk is subjected to a unique series of information recording steps whereby the particular disk becomes functionally linked to a certain, preselected computer hardware system. More specifically, the recording process of the invention permanently records onto the disk a series of magnetic "signals" representative of information containing the following:

1. a basic command on "boot" program which automatically executes upon inserting the disk in the disk drive of the selected computer system, i.e., the "boot" program instructs the computer as to how it is to proceed to read the remainder of the disk.

2. The proprietary program to be sold or leased to the ultimate, authorized user;

3. A linking program which, pursuant to the invention, contains instructions causing the selected computer to operate, during the initial run of the disk, to obtain identifying information which is unique to the selected machine and to permanently record on the disk, at a predetermined location, the unique identifying information, and 4. A verification program which, also pursuant to the invention, causes the computer, during all subsequent uses of the disk, to obtain corresponding indentifying information for the computer being used and to compare the identifying information recorded on the disk with the corresponding identifying information obtained from the computer being used and thereafter instructs the computer to proceed to read and execute the proprietary program if and only if there is a match between the compared identifying information.

According, the invention provides a recording method which physically stores on a disk, in a predetermined order, information containing further operative instructions for a first used computer whereby the first used computer initially operates to obtain and record on the disk additional, identifying information unique to the first-to-be-used computer. The disk, at this point, is fully recorded, as contemplated by the invention, and contains a physical arrangement of information that functionally and operatively links the disk to the particular, first-to-be-used computer system.

The recording system of the invention is fundamentally a two phase recording system wherein phase one of the system is utilized to record on the disk all of the basic information meant to be stored thereon, e.g., the proprietary program and the "boot" program, as well as additional information which makes the first computer used in connection with the disk a component used to effect phase two of the recording system. As should be understood, phase two involves the recording of unique identifying information on the disk by the first used computer. Moreover, the invention includes the step of recording instructional information on the disk, during phase one, whereby, after completion of the two phase recording, the disk is functional only in connection with the selected, first-to-be-used computer which operated as the phase two recorder.

In accordance with the preferred embodiment of the invention, the identifying information may consist of any suitable information which is readily available within the first used computer and which uniquely identifies the particular machine. For example, the identifying information may consist of a serial number of a component of the machine such as a ROM, EPROM MOTHERBOARD, etc. Typically, the serial number for each component is stored in machine readable form within the component. Thus, a unique serial number may be read and stored on the disk by the first used computer by virtue of the instructions of the linking program. An alternative would be to simulate a diagnostic program. Such a program would determine exactly what the configuration of the computer and accessories is (e.g. type of printer, # disks, amount of memory, # serial ports, # parallel ports, etc.) The result would be stored in a hidden file on the disk.

Additional alternative sources of identifying information may include predetermined sections of ROM chips of the computer which may be transcribed onto the disk or a unique code or serial number generated by the linking program itself. The self generated code would then be stored within a component of the selected computer as well as on the disk. Any one of the above discussed forms of identifying information will provide a unique link between the disk and the selected computer system. What is critical to the invention is that the recording of information on the disk include computer executable instructions such that the total recording process entails the phase two recording step wherein the particular first-to-be-used computer completes the recording process by recording onto the individual disk information that will link the disk to the particular machine.

Pursuant to another feature of the invention, an additional "destroy" program may be recorded on the disk during phase one. The destroy program will instruct the first used computer to destroy the linking program after the linking program has been executed by the first used computer to record the identifying information on the disk. In this manner, it would not be possible to tamper with the phase two linking aspects of the recording process of the invention once the linking program has been executed by the selected computer. Additional "protection programs" may also be recorded onto the disk during the phase one recording step to further protect the proprietary software program and to minimize the opportunities to tamper with the disk. For example, a scramble program may be arranged to instruct a computer system to scramble the disk's "Sector Id's" whereby the computer is in effect instructed to treat the disk as if it were damaged or blank. In this manner, the computer will not be able to locate for copying information on the disk, such as the verify program and the unique identifying information recorded onto the disk during the phase two recording step. Furthermore, each disk may be prepared to include predetermined "errors", e.g., a "bad Sector Id". Such predetermined errors will prevent a user from accessing the list of files on the disk, thereby making it extremely difficult to find the name or location of the hidden identifying information data file, as well as the linking and verify programs. The above described methods for increasing the difficulty in tampering with the contents of the disk are well known in the art and when used in conjunction with the two phase recording process of the invention, will act to further protect a software developer from unauthorized use of his proprietary program. Moreover, the present invention comtemplates the inclusion of special instructions in the boot program which will cause a computer system to operate in a manner to prevent tampering with the verify program procedure recorded onto the disk during the phase one step of the recording method of the invention, as will appear.

For a better understanding of the above and other features and advantages of the invention, reference should be made to the following detailed description of a preferred embodiment of the invention and to the accompanying logic flow diagrams.

DETAILED DESCRIPTION OF A PREFERRED EMBODIMENT OF THE INVENTION

The method of the invention is operational in connection with any commercially available computer system and, in particular, in connection with a personal or mini-computer system. Moreover, the particular means utilized to permanently store the application program information to be executed by the computer system may comprise any of the commonly used, commercially available memory means operable with a computer system for reading and execution of permanently stored information, as, for example, magnetic disks, tapes, cassettes etc. However, the present description will be made in terms of a disk component.

Figure 1:
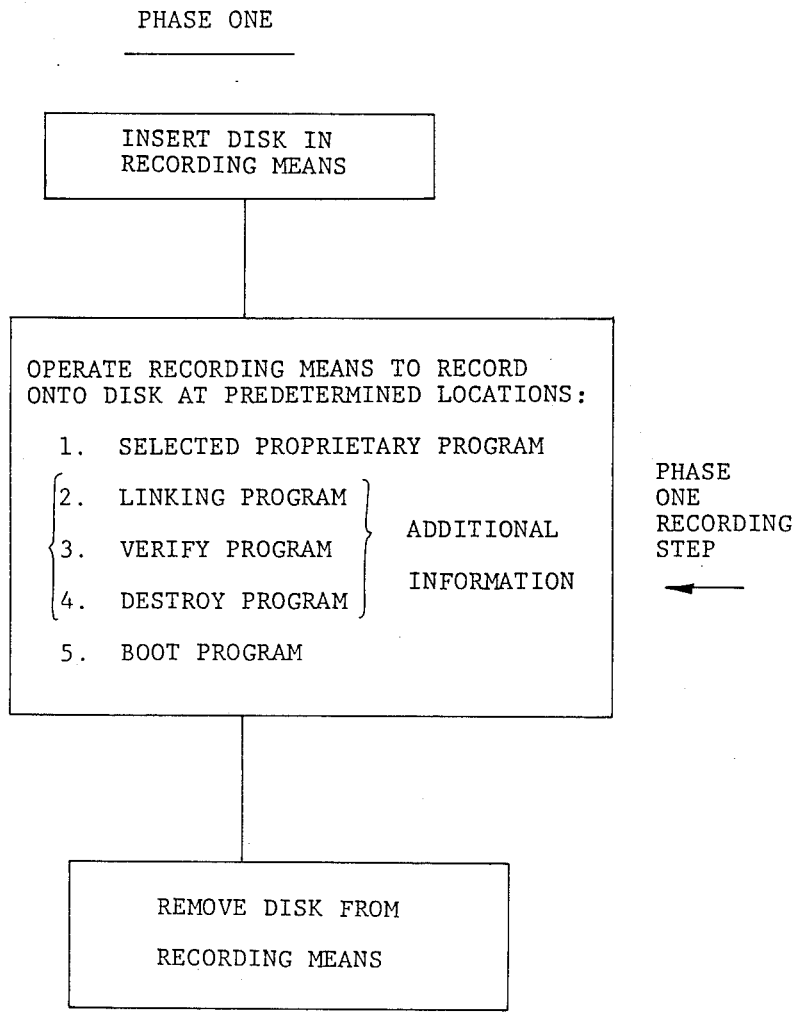
FIG. 1 illustrates, in block diagram, flow chart form, phase one of the recording system of the invention.

Referring now to FIG. 1, it should be understood that software developers utilize well known manufacturing techniques to copy a particular proprietary program onto each of a large number of individual disks whereby the program may be mass distributed to many authorized users. Pursuant to the invention, each disk is inserted into a commercial recording means and the recording means is operated to record onto the disk information in a form that will provide a permanent and executable copy of the proprietary material to be sold and additional information, also in a permanent and executable form, containing operating instructions for a first used computer system (i.e., the first computer upon which the disk is run).

Furthermore, a "Disk Operating System" (referred to as a DOS), including a boot program is recorded onto each disk whereby, in a well known manner, the boot program will be executed automatically upon insertion of the disk into the disk drive of the computer to instruct the computer as to how it is to read the information stored on the disk. The DOS contains the necessary instructions to instruct the computer as to how to operate generally in conjunction with the disk. At this point, the recording means has completed phase one of the recording process according to the invention. The disk now contains a permanent record of information sufficient to provide an authorized purchaser with a usable form of any particular program meant to be sold and distributed by a software developer. Significantly, the disk also contains a boot program and additional program information such that the disk will initially operate as a self executing program to operate the first used computer as an additional recording means whereby the identifying information may be recorded onto the disk. More specifically, the unique information recording step of phase one provides a series of instructions contained in the linking, verify and boot programs. The additional information is arranged on the disk such that the boot program causes the first-to-be-used computer to execute the linking program upon first use and the verify program upon subsequent uses of the disk.

In addition, the boot program may include special instructions to a computer system used in conjuction with the disk, whereby the boot program causes the computer to verify that the unique identifying information ascertained and recorded during phase two is contained in a hidden data file on the disk, and furthermore, that the verify program is also present on the disk. These additional verifying steps contained in the boot program will be executed by the computer prior to the primary verification step taught by the present invention, and just after enough of the "disk operating system" has been read by the computer to accomplish the verification of the presence of the unique identifying information and the verify program on the disk. If the operation of the computer pursuant to the special instructions of the boot program indicates that the disk files storing the unique identifying information and verify program are intact, the boot program will instruct the computer to continue to read the disk operating system and thereafter, continue to execute the verify program and execute the proprietary program if and only if there is a predetermined match between the compared identifying information, as discussed above. In the event that the boot program special instructions causes the computer to ascertain that the verify program and unique identifying information are not intact on the disk, the boot program will prevent the computer from continuing to read the remainder of the disk operating system. Thus, the computer system will not have a sufficient amount of the disk operating system to continue to function in conjunction with the disk. The boot program may be written to contain additional instructions to proceed to delete and/or destroy portions of the recorded disk to thereby render the disk inoperable after it has been determined that the unique identifying information and verify program are not present on the disk in accordance with the two phase recording system of the invention.

Figure 2:
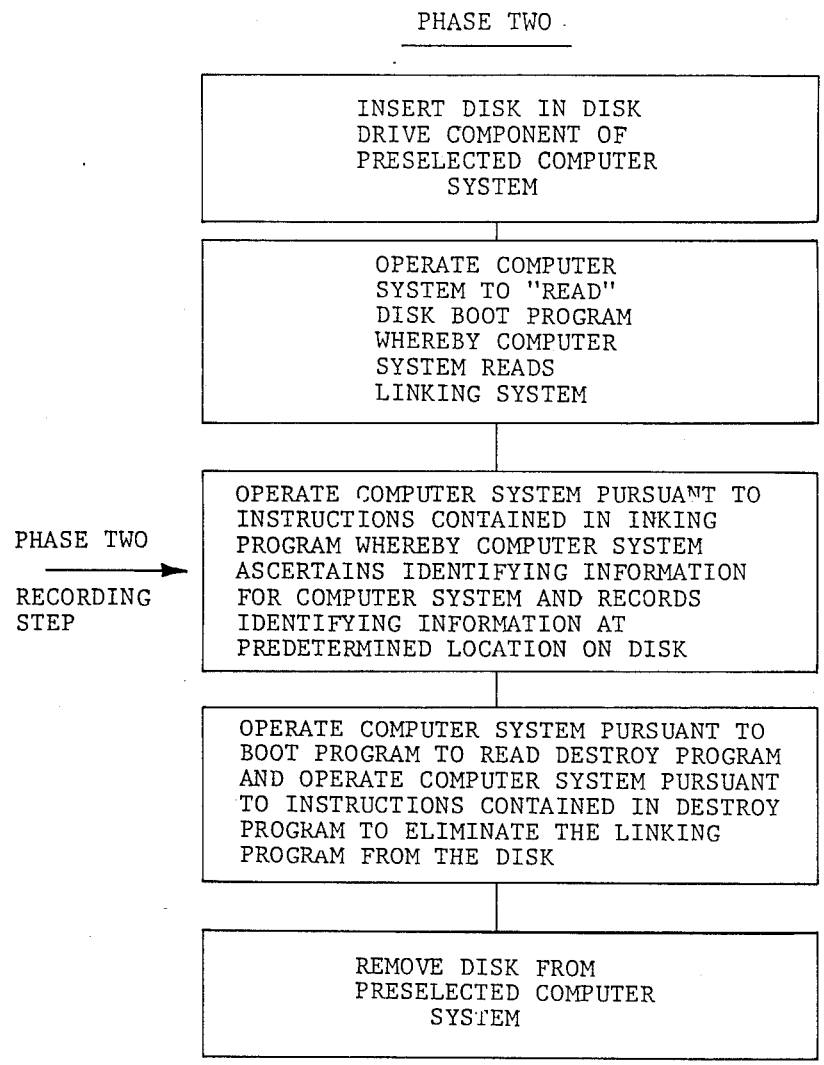
FIG. 2 illustrates, in block diagram, flow chart form, phase two of the recording system of the invention.
Figure 3:
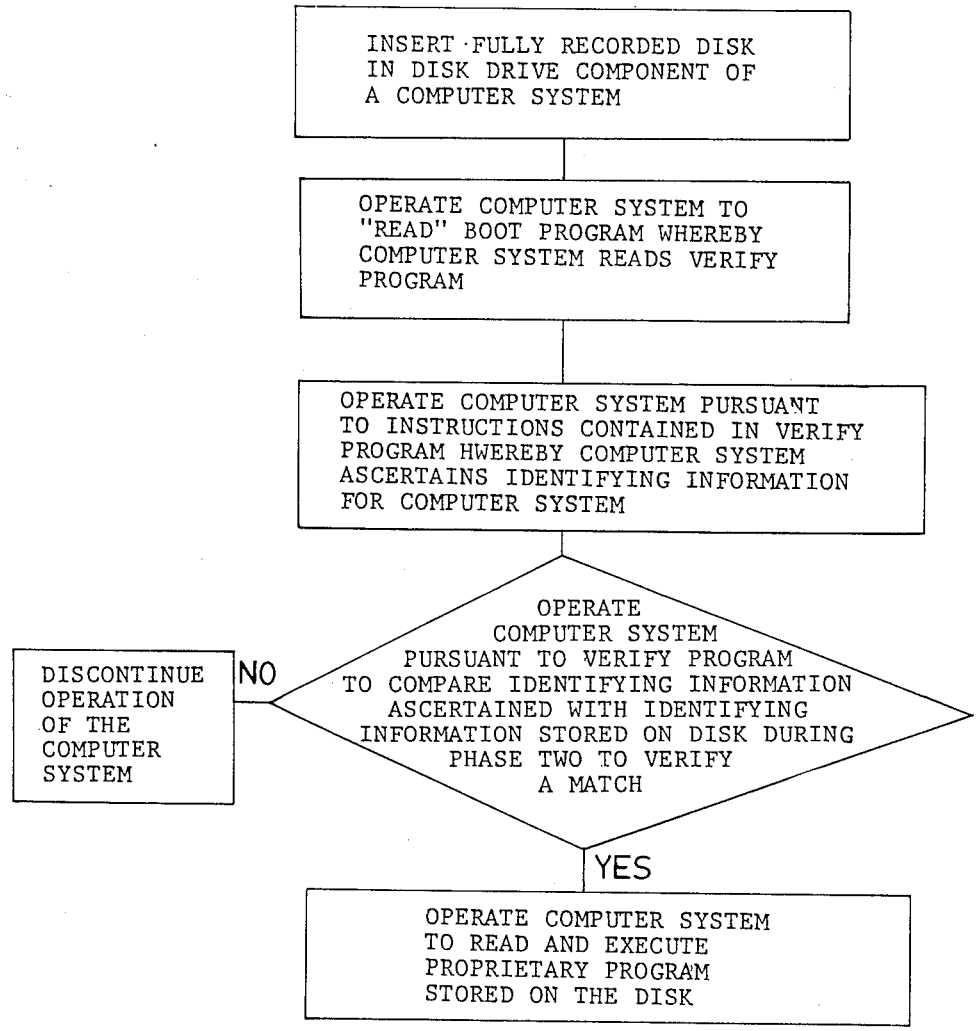
FIG. 3 illustrates, in block diagram, flow chart form, the operation of a computer system utilizing a disk containing information recorded thereon pursuant to the invention.

Referring now to FIG. 2, the block diagram illustrates the initial operation of the first used computer upon inserting and "booting" the disk in its disk drive. As contemplated by the invention, the boot program and linking program recorded onto the disk during phase one cause the first-to-be-used computer to ascertain and record onto the disk unique identifying information. The identifying information may be stored on a hidden file on the disk. At this point, the recording process of the invention is complete and thereafter the computer will operate with the disk as clearly illustrated in FIG. 3. FIGS. 2 and 3 provide a clear representation of the logic of operation of the computer during the first and subsequent runs of the disk, respectively.

The present invention therefore provides a highly advantageous information recording process whereby a proprietary program may be mass distributed in a form that will protect the software developer from unauthorized and uncontrolled distribution of his product. The first phase of the recording process provides a high volume of disk products for mass distribution. The second phase recording aspects of the invention complete the recording of each disk in an individual recording step on the selected first used computer to effectively link the operability of the individual disk to a particular computer machine. The two phase recording concept embodied in the method of the invention records information in a form that is freely and readily usable by an authorized user of proprietary software, but which is not usable apart from the use environment authorized by the owner of the proprietary information. The invention is straightforward and convenient to implement and, at the same time, provides a highly effective means for protecting the rights of the software developer.

The above-described embodiment of the invention is meant to be representative only as certain changes may be made therein by those skilled in the art without departing from the clear teachings of the invention. Accordingly, reference should be made to the following appended claims in determining the full scope of the invention.

What is claimed is:

1. A method of recording information on a permanent memory element, comprising the steps of
    (a) providing a permanent memory element,
    (b) providing a recording means,
    (c) operating said recording means in conjunction with said permanent memory element to record onto said permanent memory element preselected information in a form that is permanently stored on said permanent memory element and readable by a computer system,
    (d) providing a computer system including reading means to read the preselected information recorded on said permanent memory element,
    (e) inserting said permanent memory element into said reading means, and
    (f) operating said computer system and said reading means in conjunction with said permanent memory element to ascertain and record onto said permanent memory element identifying information which is unique to said computer system,
    (g) said preselected information including a set of instructions which is read and executed by a computer system to render operative said permanent memory element with a computer system if and only if there is a predetermined correspondence between the unique identifying information recorded on said permanent memory element pursuant to step (f) and corresponding identifying information obtained from the computer system in connection with which the permanent memory element is being used.

2. The method according to claim 1, further characterized by, after completion of step (f) of claim 1, operating said computer system and said reading means in conjunction with said permanent memory element whereby said computer system selectively eliminates certain of said preselected information from said permanent memory element.

3. A method of recording information on a permanent memory element and operating a computer system in conjunction with said permanent memory element comprising the steps of
    (a) providing a permanent memory element,
    (b) providing a recording means,
    (c) operating said recording means in conjunction with said permanent memory element to record onto said permanent memory element preselected information including:
        (i) operating instructions executable by a computer system and instructing the computer system to ascertain identifying information unique to said computer system and to record said identifying information at a predetermined location on said permanent memory element, and (ii) operating instructions executable by a computer system and instructing the computer system to ascertain identifying information unique to said computer system and to compare the identifying information ascertained by the computer system pursuant to the operating instructions of this step (c)(ii) with the identifying information stored on the permanent memory element pursuant to the operating instructions of step (c)(i), (d) providing at least one computer system including complementary reading means to read the preselected information recorded on said permanent memory element, (e) initially operating a preselected one of said at least one computer system and the complementary reading means in conjunction with said permanent memory element to read and execute the operating instructions recorded on the permanent memory means pursuant to step (c) (i), (f) and thereafter operating any of said at least one computer system and said complementary reading means in conjunction with said permanent memory element to read and execute the operating instructions recorded on the permanent memory means pursuant to step (c) (ii), (g) thereafter operating any of said at least one computer system if and only if there is a predetermined correspondence between said identifying information and the identifying information ascertained pursuant to the operating instructions of step (c)(ii).

4. A method of recording information on a permanent memory element and operating a computer system in conjunction with said permanent memory element comprising the steps of (a) providing a permanent memory element, (b) providing a recording means, (c) operating said recording means in conjunction with said permanent memory element to record onto said permanent memory element preselected information including:

(i) operating instructions executable by a computer system and instructing the computer system to ascertain identifying information unique to said computer system and to record said identifying information at a predetermined location on said permanent memory element, (ii) operating instructions executable by a computer system and instructing the computer system to ascertain identifying information unique to said computer system and to compare the identifying information ascertained by the computer system pursuant to the operating instructions of this step (c)(ii) with the identifying information stored on the permanent memory element pursuant to the operating instructions of step (c)(i), and (iii) operating instructions executable by a computer system and instructing the computer system to ascertain on the permanent memory element (of) the operating instructions of step (c) (ii) and the unique identifying information recorded on the permanent memory element pursuant to the operating instructions of step (c) (ii), (d) providing at least one computer system including complementary reading means to read the preselected information recorded on said permanent memory element, (e) initially operating a preselected one of said at least one computer system and the complementary reading means in conjunction with said permanent memory element to read and execute the operating instructions recorded on the permanent memory means pursuant to step (c) (i), (f) and thereafter operating any of said at least one computer system and said complementary reading means in conjunction with said permanent memory element to read and execute the operating instructions recorded on the permanent memory means pursuant to steps (c) (ii) and (c) (iii), (g) thereafter operating any of said at least one computer system (of step (f) further to step (f),) if and only if the at least one computer system ascertains on the permanent memory element (the existence of) the operating instructions of step (c) (ii) and the unique identifying information and there is a predetermined correspondence between said identifying information and the identifying information ascertained pursuant to the operating instruction of step (c) (ii) (the compared identifying information).

* * * * *